Figure 3:
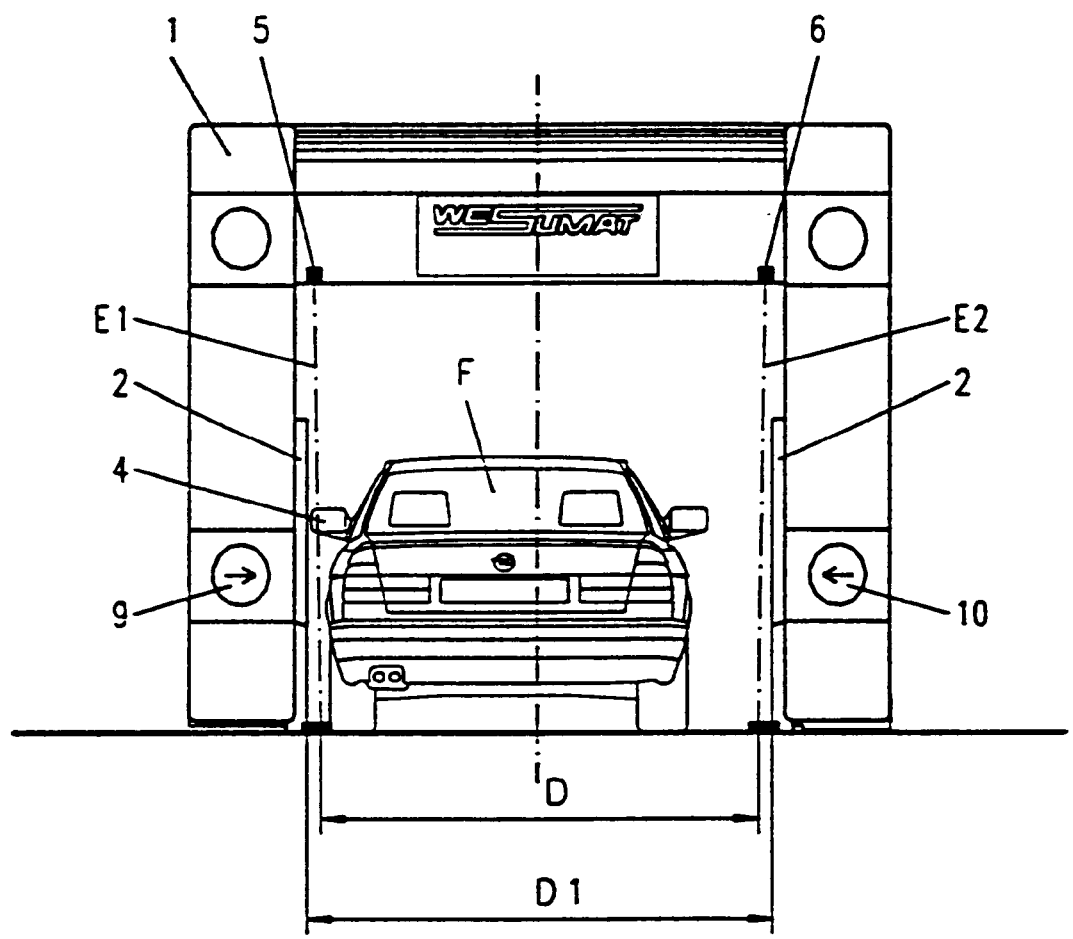

United States Patent [19]
Decker

[11] Patent Number: 6,147,625
[45] Date of Patent: Nov. 14, 2000

[54] DEVICE FOR POSITIONING MOTOR VEHICLES IN FRONT OF A CAR WASH

[75] Inventor: Wolfgang Decker, Zusmarshausen-Wollbach, Germany

[73] Assignee: Wesumat Fahrzeugwaschanlagen GmbH, Augsburg, Germany

[21] Appl. No.: 09/441,161

[22] Filed: Nov. 15, 1999

[30] Foreign Application Priority Data

Nov. 25, 1998 [DE] Germany .............. 298 21 066

[51] Int. Cl.⁷ .................................. B60Q 1/48
[52] U.S. Cl. .............. 340/933; 340/943; 340/935; 340/941; 340/932.2; 134/57 R; 134/18; 134/123
[58] Field of Search ................ 340/932.2, 933, 340/943, 935, 941; 701/117; 134/57 R, 123, 18

[56] References Cited

U.S. PATENT DOCUMENTS

| | | |
|---|---|---|
| 3,596,241 | 7/1971 | Migneault ................ 340/61 |
| 4,945,645 | 8/1990 | Brügelmeir, Jr. .......... 33/203.14 |
| 4,946,513 | 8/1990 | Del Prato et al. ......... 134/18 |
| 5,329,949 | 7/1994 | Moncourtois et al. ...... 134/57 R |
| 5,555,593 | 9/1996 | Decker ................... 15/302 |
| 5,803,098 | 9/1998 | Decker ................... 134/56 R |
| 5,886,648 | 3/1999 | McElroy et al. .......... 340/943 |
| 5,960,564 | 10/1999 | McElroy et al. ......... 34/666 |

FOREIGN PATENT DOCUMENTS

| | | |
|---|---|---|
| 396 054 | 11/1990 | European Pat. Off. . |
| 32 08 527 | 11/1982 | Germany . |
| 297 23 828 | 5/1999 | Germany . |
| 60128047 | 7/1985 | Japan . |
| 7215177 | 8/1995 | Japan . |

*Primary Examiner*—Daniel J. Wu
*Assistant Examiner*—Hung Nguyen
*Attorney, Agent, or Firm*—Flynn, Thiel, Boutell & Tanis, P.C.

[57] ABSTRACT

With this device for positioning motor vehicles (F) in front of vehicle washing plants, especially portal washing plants, at least one transmitting-/receiving device (5, 6) in the portal is assigned to each terminating plane (E1, E2), which portal has a clear space of a predetermined clearance width (D), which clear space is delimited laterally by imaginary, substantially vertical terminating planes (E1, E2) extending in the direction of movement. Said transmitting-/receiving device emits signals, which extend substantially in the terminating plane (E1, E2) in the space in front of the portal (1), and receives said signals. For each terminating plane (E1, E2) there is provided one display unit (9, 10) which is influenced by the associated transmitting-/receiving device (5, 6) and is located in the field of vision of the driver such that, when the received signals change as a result of vehicle parts (4) protruding into the respective terminating plane (E1, E2), the associated display device (9, 10) is activated.

11 Claims, 3 Drawing Sheets

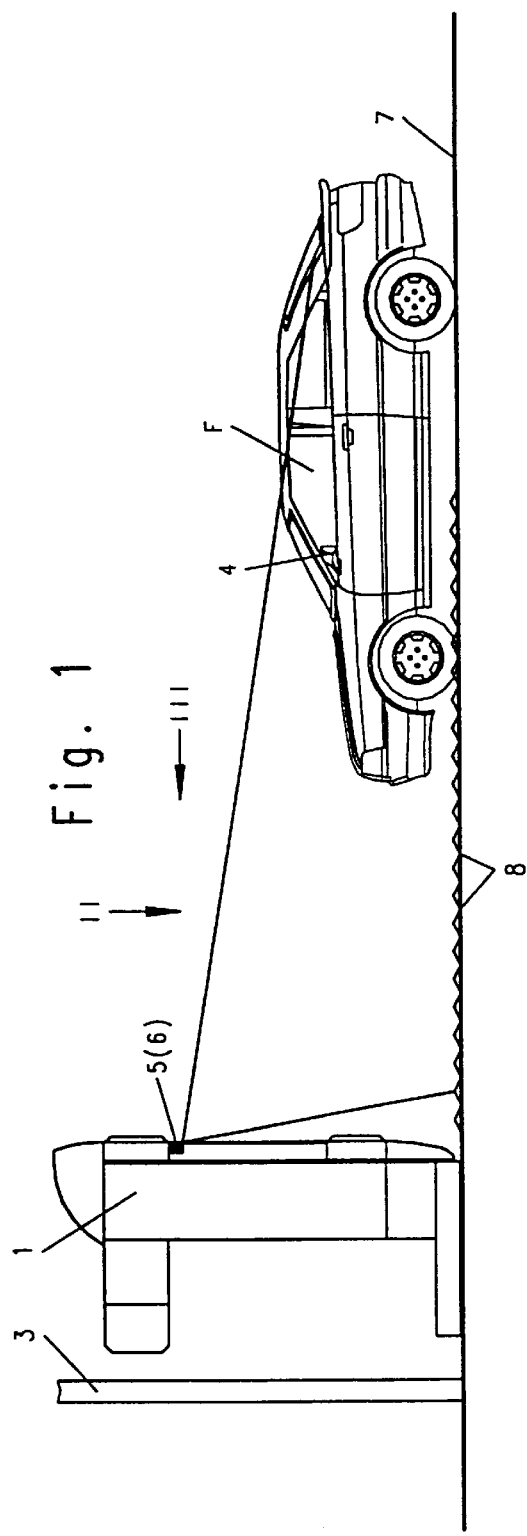
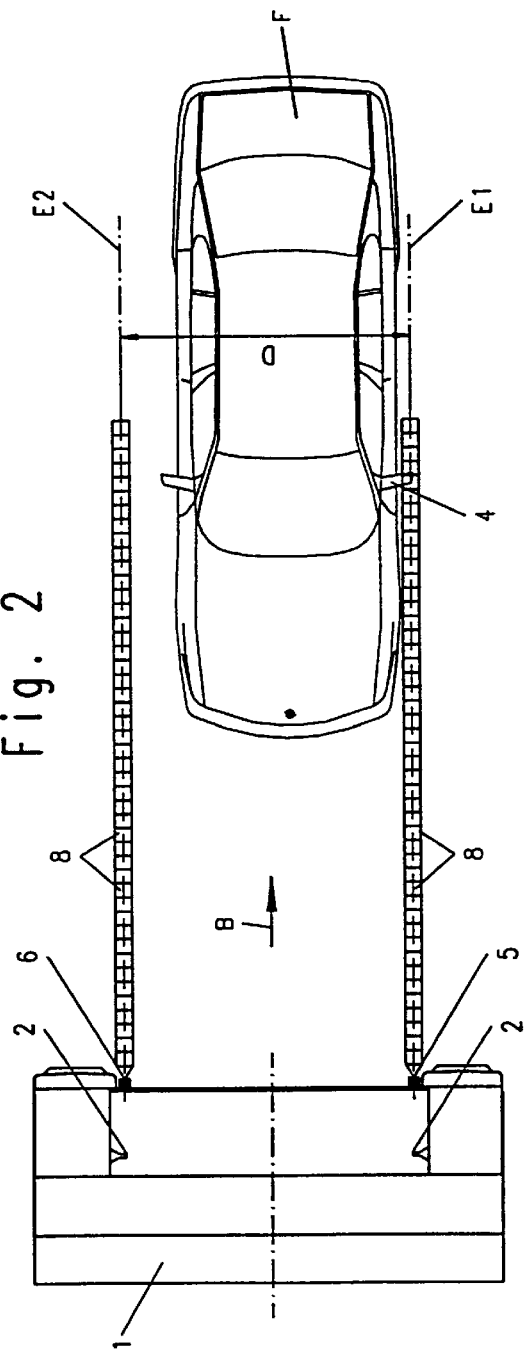

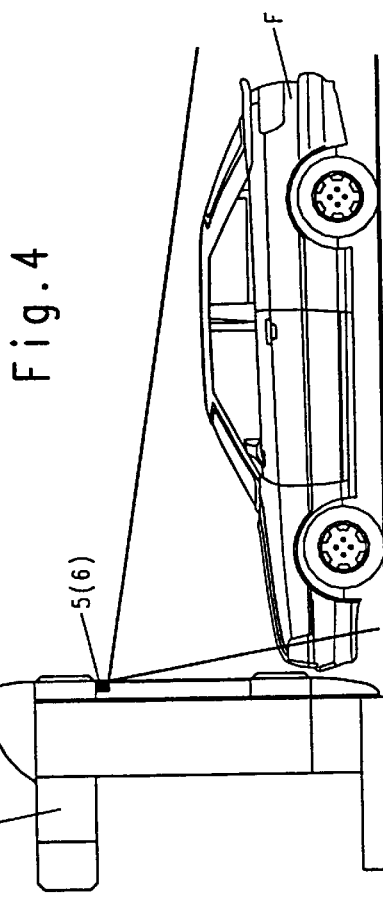
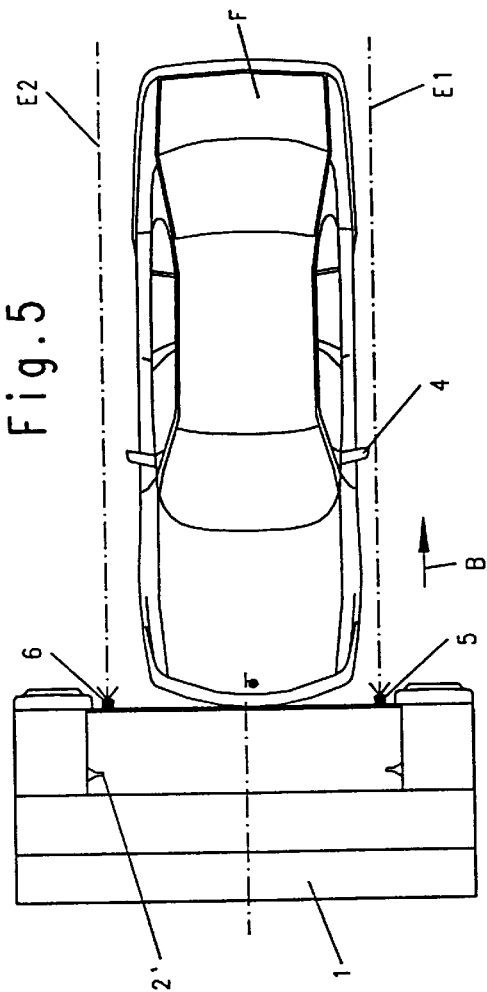
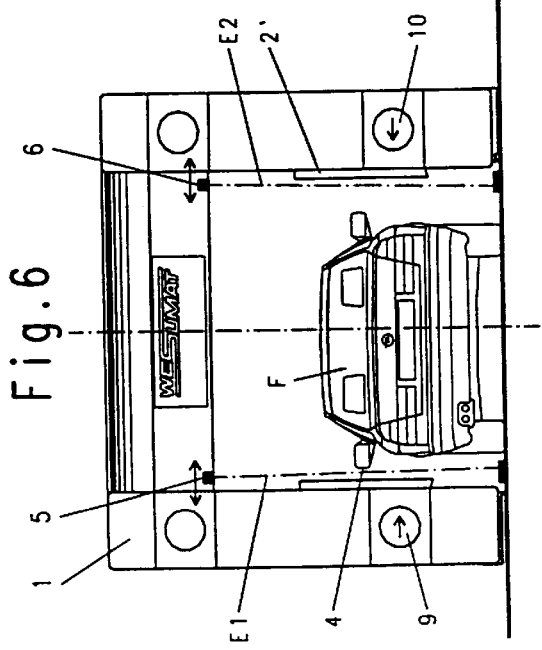

DEVICE FOR POSITIONING MOTOR VEHICLES IN FRONT OF A CAR WASH

The invention relates to a device for positioning motor vehicles in front of vehicle washing plants, especially portal washing plants, having a portal which is moveable in a moving direction relative to the motor vehicle and has a clear space (free passage) of a predetermined clearance width which is delimited laterally by imaginary, substantially vertical terminating planes extending in the direction of movement.

Portal washing plants have a maximal clearance width of 2.2 m, conditioned by the prescribed constructional size of available washing bays. Because of the motor vehicle widths which are common today, especially because of the larger exterior mirrors mounted on the vehicles for reasons of safety it is becoming increasingly harder for average drivers to position their vehicle in the wash bay in front of the portal such that a proper washing procedure which is non-damaging to the vehicle is possible. More and more often, damage is occurring to exterior mirrors which knock against high pressure nozzles, drying nozzles and other parts built onto the portal, such as e.g. water pipes etc. Normally this risk is reduced by the installation of wheel guide-rails on the bay floor. However, in order to enable washing of small vans, off-road vehicles and the like, the wheel guide-rails must be laid at a mutual inner spacing of 2 m. This leads to the fact that rear-view mirrors can be damaged in spite of the wheel guide-rails if the vehicles are not positioned centrally but with the wheels lying to the right or left of the wheel guide-rails. The damage quota which is then still possible could be avoided by safeguarding the clear space by means of contact strips, light barriers or the like. This method has the disadvantage however that an emergency cut-off of the portal washing plant is effected during the washing process. This demands the intervention of a staff member which is not possible in petrol stations which are generally operated by only one person at the cash desk. This cashier would have to get all of the customers to leave the petrol station shop before leaving the latter and close the cash-desk and the shop as this would constitute a security risk otherwise.

The object underlying the invention is therefore to demonstrate a device for positioning motor vehicles in front of vehicle washing plants, especially portal washing plants, of the type mentioned initially which makes it possible for the driver to position his vehicle in front of the portal while driving in to the washing plant such that no vehicle parts protrude beyond the clear space of the portal during the washing process.

This is achieved by the invention in that at least one transmitting-/receiving device is assigned to each terminating plane which device transmits and receives signals which extend substantially in the terminating plane into the area in front of the portal (entry region) and in that, for each terminating plane, there is provided one display device which is influenced by the associated transmitting-/receiving device and is located within the field of vision of the driver, such that, when the received signals change as a result of vehicle parts protruding into the respective terminating plane, the associated display device is activated.

The advantage of this device resides in the fact that the system indicates to the driver of the vehicle whether he must adjust his direction of travel to the left or right while driving in to the wash bay. If for instance the signals emitted from the transmitting-/receiving device are disturbed while driving in the vehicle by a vehicle part, e.g. an exterior mirror protruding into the terminating plane then this is conveyed from the transmitting-/receiving device to the display device. By means of an optical display, for example in the form of flashing lights, flashing arrows and/or acoustic devices, the driver is made aware of the defective position of the vehicle and can still correct his direction of travel while driving in, as a result of which the exterior mirror normally no longer encroaches in the terminating plane. This results then in the display device being switched off again. Should the driver make no adjustment or an inadequate adjustment of his direction of travel the display device continues to be activated. The transmitting-/receiving device can also be coupled to the drive of the portal such that the washing process is not started at all. No manual intervention by the operator is then required either. It can be indicated to the driver optically and acoustically that he must position his vehicle once more. By means of correct positioning of the vehicle within the clear space of the portal, damage to protruding vehicle parts, such as exterior mirrors is of course avoided.

Advantageous embodiments of the invention are characterised in the sub-claims.

The invention is explained subsequently in greater detail with reference to embodiments, given by way of example and illustrated in the drawings, which show:

FIG. 1 side view of a portal washing plant with the device according to the invention, FIG. 2 the associated plan view in direction II of FIG. 1, FIG. 3 the associated end view in direction III of FIG. 1, FIGS. 4, 5, and 6 side view, plan view and end view of a second embodiment.

In the drawings, the invention is explained on portal washing plants because it is especially suited hereto. However, the device according to the invention could also be arranged possibly in the entry region of a car wash in order to make the correct entry into the car wash easier for the driver.

The portal 1 of a portal washing plant is moveable to and fro in the direction of movement B. Said portal normally bears washing devices in the form of horizontal and vertical washing brushes, high pressure nozzles, drying nozzles and the like. In the drawings, only two lateral drying devices 2 of these operating devices are illustrated. Before the washing process begins, the portal 1 adopts a position near to the rear wall 3 of a wash bay, the entry gate of which is arranged in a position opposite to the rear wall 3.

The portal 1 has a free passage, which is generally designated as clear space. This clear space is indicated in FIG. 3 with dotted lines. The clearance width D of the clear space is smaller by a security spacing at both sides than the mutual spacing D1 of both drying nozzles 2 or other operating devices of the portal. The clear space must be dimensioned such that a vehicle positioned within the clear space does not collide against any devices of the portal 1 with any of the vehicle parts. The clear space is delimited laterally by imaginary, substantially vertical terminating planes E1 and E2 extending in the direction of movement B.

The vehicle F to be washed is driven into the wash bay approaching from the right, according to the drawings of FIGS. 1 and 2, and must be positioned in front of the portal 1 before the washing process begins such that said vehicle is located with all its parts within the clear space defied by the lateral terminating planes E1 and E2. For a better understanding, the vehicle F is however not illustrated in its correct position in FIGS. 2 and 3 but displaced a little to the left, as viewed in the direction of travel of the vehicle so that the left exterior mirror 4 of the vehicle protrudes into the plane E1 and passes through the latter.

Furthermore, at least one transmitting-/receiving device 5, 6 is assigned, according to the invention, to each terminating plane E1 and E2. Each of the two transmitting-/receiving devices 5, 6 transmits signals within very narrow signal beams, as viewed in plan view, which beams extend substantially in the respective terminating plane E1 or E2. According to the technical-physical operating principle of the transmitting-/receiving device used, the signals are normally reflected from the bay floor or from reflection devices arranged on the bay floor and received by the receiver of the device. If any vehicle part, e.g. an exterior mirror, encroaches into the course of the signal which extends substantially in the imaginary terminating plane E1 or E2, the intensity of the signal recorded in the receiver changes. However, the transmitting-/receiving device can also be configured technically-physically such that no signals are reflected from any normally present devices, such as the bay floor and normally signals are also not received by the receiver. Only when a part of the vehicle, e.g. an exterior mirror proceeds into the terminating plane E1 or E2 is the signal reflected and picked up by the receiver.

The transmitting-/receiving devices 5, 6 can be constructed according to the principle of radar technology. The transmitting-/receiving devices 5, 6 can also operate however according to the principle of light technology, especially with infrared light.

It is expedient for reflection devices 8 to be provided on the floor 7 of the wash bay along each terminating plane E1, E2, which reflection devices are fixed expediently to the normal wheel guide-rails. It is also possible by means of these reflection devices 8 to operate the transmitting-/receiving device at low capacity since the emitted signals are reflected in a more targeted manner and the level registered by the receiver can be increased.

While the transmitting-/receiving devices 5, 6 in the case of a portal washing plant can be fixed to the portal 1, they can be arranged on any mounting in car washes, also in a region above the entry gate.

The transmitting-/receiving device 5 co-operates with a display device 9 provided on the portal 1 while the transmitting-/receiving device 6 influences the second display device 10 provided on the portal 1. In the case of display devices 9, 10, optical display devices in the form of flashing lights, flashing arrows or the like can be used expediently. The display device can also be coupled to an acoustic signal which catches the attention of the driver. The display device can possibly emit also stored oral signals, such e.g. "Please move to the right" or "Please move to the left".

The operating method of this new device is the following:

When the driver drives the vehicle F into the wash bay and travels too far to the left thereby relative to the portal 1, the left exterior mirror 4 penetrates the imaginary terminating plane E1. The exterior mirror 4 comes thus into the course of the signal emitted by the transmitting-/receiving device 5 as a result of which the signal received by the receiver changes. This change is used for activating the display device 9. The arrow of the display device 9 begins to flash and if necessary an acoustic signal is also sounded. As a result the driver is made aware that he must steer his vehicle further to the right. When he makes the correct and adequate adjustment the left exterior mirror 4 proceeds out of the course of the signal of the transmitting-/receiving device 5 and the vehicle is then positioned correctly relative to the portal 1 within its clear space. The transmitting-/receiving devices 5, 6 are then switched off and the washing process can begin. If the vehicle F has not been correctly positioned and the exterior mirror 4 continues to protrude into the terminating plane E1, the transmitting-/receiving devices 5, 6 continue to be activated. The travelling mechanism of the portal 1 is blocked simultaneously by the transmitting/receiving device 5. When e.g. a display board lights up, the driver is informed that he must reverse the vehicle and position it again.

In the embodiment illustrated in FIGS. 4–6, the transmitting-/receiving devices 5, 6 on the portal are arranged displaceably horizontally and transversely relative to the direction of movement B, as is indicated by the arrows in FIG. 6. In order to position the vehicle, said transmitting/receiving devices are moved respectively according to FIGS. 5 and 6 into an external position in which the signals transmitted from said transmitting/receiving devices are located substantially in the terminating plane E1 or E2. After the vehicle has been positioned correctly relative to the portal in the previously described manner so that no vehicle part is protruding beyond the clear space defined by the terminating planes E1, E2, the vehicle may still be positioned off-centre relative to the operating region of the portal, as is illustrated in the drawing. This has the disadvantage that e.g. the right drying nozzle 2' is arranged at too great a spacing from the right-hand side of the vehicle and only inadequate drying would be achieved. By displacing the transmitting-/receiving devices 5, 6 to the centre of the vehicle the actual position of the vehicle can be determined. As soon as e.g. the right transmitting-/receiving device 6 detects the right-hand exterior mirror during displacement towards the centre of the vehicle and a change in the received signal is determined, said device cuts out. Corresponding to the path covered by the transmitting-/receiving device 6 towards the centre of the vehicle, the right-hand drying nozzle 2' is also moved inwards so that it is located at an optimal spacing to the vehicle. High pressure nozzles can also be controlled in a similar manner.

What is claimed is:

1. Device for positioning motor vehicles in front of vehicle washing plants, having a portal which is moveable in a moving direction relative to the motor vehicle and has a clear space (free passage) of a predetermined clearance width which is delimited laterally by imaginary, substantially vertical terminating planes extending in the direction of movement, characterised in that at least one transmitting-/receiving device (5, 6) is assigned to each terminating plane (E1, E2) which device transmits and receives signals which extend substantially in the terminating plane (E1, E2) into the area in front of the portal (1) (entry region) and in that, for each terminating plane (E1, E2), there is provided one display device (9, 10) which is influenced by the associated transmitting-/receiving device (5, 6) and is located within the field of vision of the driver, such that, when the received signals change as a result of vehicle parts (4) protruding into the respective terminating plane (E1, E2), the associated display device (9, 10) is activated.

2. Device according to claim 1, characterised in that reflection devices (8) are provided on the floor (7) of the wash bay along each terminating plane.

3. Device according to claim 1, characterised in that the transmitting/receiving device (5, 6) is constructed according to the principle of radar technology.

4. Device according to claim 1, characterised in that the transmitting/receiving device (5, 6) is constructed according to the principle of light technology.

5. Device according to claim 4, characterised in that the transmitting/receiving device (5, 6) operates with infrared light.

6. Device according to claim 1, characterised in that the transmitting-/receiving devices (5, 6) are arranged on the portal (1).

7. Device according to claim 1, characterised in that the transmitting-/receiving device (5, 6) blocks the travelling movement of the portal (1) as long as a change in the received signal continues.

8. Device according to claim 1, characterised in that the transmitting-/receiving device (5, 6) for determining the respective lateral position of a vehicle is arranged displaceably on the portal (1) horizontally and transversely relative to the direction of movement (B) for the purpose of controlling the operating units (2') of the portal (1) according to the determined position.

9. Device according to claim 1, characterised in that the display devices (9, 10) are arranged on the portal (1).

10. Device according to claim 1, characterised in that the display devices (9, 10) deliver optical displays.

11. Device according to claim 1, characterised in that the display devices (9, 10) deliver acoustic signals or instructions.

\* \* \* \* \*